Figure 1:
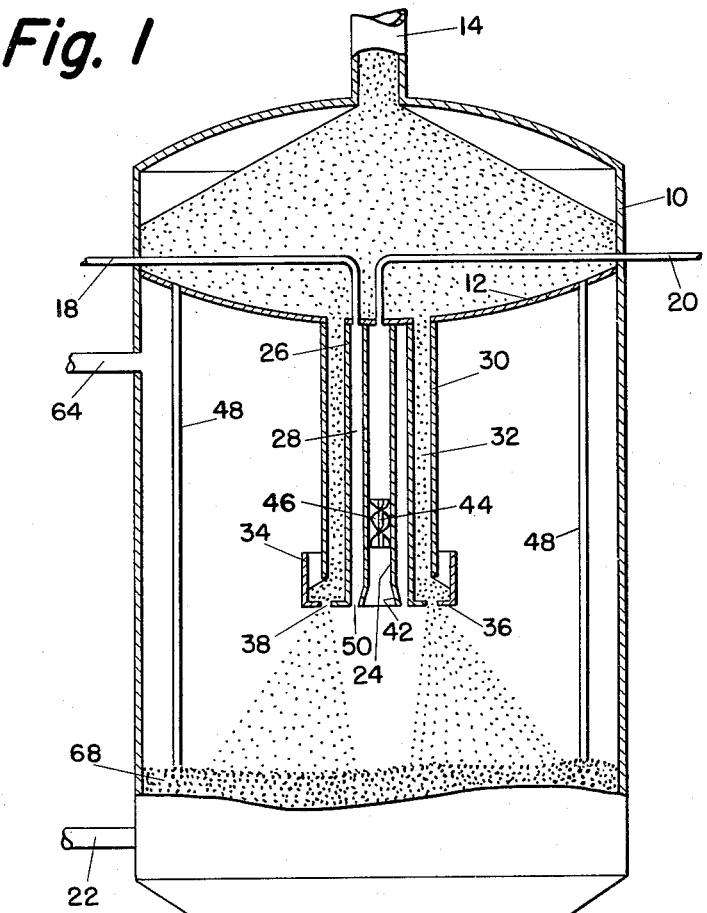

Sept. 5, 1961     W. L. McCLURE     2,999,012
APPARATUS FOR CONTACTING HYDROCARBONS WITH SOLIDS
Filed Sept. 3, 1958     2 Sheets-Sheet 1

INVENTOR
WILLIAM L. MC CLURE
BY
Robert O. Spindle
ATTORNEY

INVENTOR
WILLIAM L. McCLURE
BY
ATTORNEY

2,999,012
**APPARATUS FOR CONTACTING HYDRO-
CARBONS WITH SOLIDS**
William L. McClure, Toledo, Ohio, assignor to Sun
Oil Company, Philadelphia, Pa., a corporation of New
Jersey
Filed Sept. 3, 1958, Ser. No. 759,379
3 Claims. (Cl. 23—284)

This invention relates to process and apparatus for converting hydrocarbons, and more particularly to means for introducing liquid hydrocarbons and granular solid conversion-supporting material into a conversion vessel.

It is known in the art to contact hydrocarbon charge stocks such as various petroleum fractions with a compact moving bed of granular solid conversion-supporting material, e.g. silica-alumina catalyst, inert heat transfer material, etc., in order to effect conversion of the charge stock. Such processes are well known in the field of cracking of higher molecular weight charge stocks to produce lower molecular weight products such as gasoline, and also in other known processes for hydrocarbon conversion.

In processes where the charge stock is introduced in liquid phase into the conversion zone, it is necessary to provide special means to obtain good contact of the liquid with the granular solids, and good distribution of the liquid throughout the moving bed of solids. In order to promote good contact and distribution, it is known to provide an annular curtain of freely falling solids, into which oil droplets are discharged from a central location. Prior methods for bringing about the contact have been subject to the disadvantage, however, that they do not provide a sufficient spreading of liquid oil and solids over the cross-sectional area of the compact bed onto which the solids fall. This lack of sufficient spreading is generally attributable to the fact that the liquid hydrocarbon charge does not have sufficient lateral movement at the time that it comes in contact with the falling solids. The provision of spray nozzles containing small perforations which give the liquid oil a lateral direction of movement at high velocity upon issuing from the perforations, is subject to the disadvantage that there is a tendency for coking of the hydrocarbon charge to occur in the nozzle and plug up the small perforations.

According to the present invention, the disadvantages of prior art apparatus and operation are overcome in a novel manner. The apparatus according to the invention provides in part a central downwardly extending conduit through which the liquid hydrocarbon charge passes, means being provided to impart rotary motion to the liquid hydrocarbons as they pass downwardly through the conduit. The conduit has secured to the open lower end thereof downwardly and laterally extending baffle means constituting a conduit section which provide benefits as subsequently more fully described. Surrounding the downwardly extending conduit is an outer annular space through which granular solids gravitate as a compact mass prior to passage through a restricted orifice into the falling solids curtain.

In operation according to the invention, the liquid hydrocarbons pass downwardly with rotary motion through the downwardly extending conduit, and then through the open lower end of the conduit into a relatively expanded zone provided therebeneath by the laterally extending baffle. As a result of the rotary motion and of the presence of the laterally extending baffle, the liquid oil passes laterally as well as downwardly into the falling curtain of solids, and by impingement on the falling solids causes them to be spread laterally over the cross section of the conversion vessel.

The invention will be further described with reference to the attached drawing, wherein FIGURE 1 is a sectional elevational view of a conversion vessel according to the invention, FIGURES 2 to 5 are sectional elevational views of conduits illustrating the principles involved in the present invention, and FIGURES 6 to 10 are sectional elevational views of modifications of the central conduit and associated apparatus according to the invention.

Referring to FIGURE 1, cylindrical conversion vessel 10 has a transverse partition 12 therewithin, an upper inlet 14 for granular solids, a lower outlet 16 for granular solids, an inlet conduit 18 for inert fluid, an inlet conduit 20 for liquid hydrocarbon charge, and an outlet conduit 22 for vaporous conversion products. Within vessel 10 and beneath partition 12 is a downwardly extending cylindrical conduit 24. Surrounding a portion of conduit 24 is a cylindrical sleeve 26 providing an inner annular passageway 28 between sleeve 26 and conduit 24. Surrounding a portion of sleeve 26 is a second cylindrical sleeve 30, providing an outer annular passageway 32 between sleeves 30 and 36. Surrounding a portion of sleeve 30 is a third cylindrical sleeve 34. Annular closure member 36 communicates with the lower ends of sleeves 26 and 30 and has an annular aperture 38 therewithin. Within conduit 24 is a concentric solid cylindrical member 44, to which are secured helical baffle means 46, the outer edges of which are in contact with or secured to the inner wall of conduit 24. Secured to the lower end of conduit 24 is a frustoconical baffle 42. A plurality of downcomers 48, of which only two are shown in the drawing, have their upper ends secured within apertures in transverse partition 12.

In operation, granular solids are introduced through inlet 14 and gravitate as a compact mass through an upper portion of conversion vessel 10. Inert sealing gas, e.g. steam, is introduced into this upper portion through means not shown, such introduction being conventional. Portions of the granular solids are gravitated through the downcomers 48 into a lower portion of conversion vessel 10. Another portion of the solids is gravitated through the outer annular passageway 32, and passes through the aperture 38, beneath which the solids fall freely in an annular curtain.

Hydrocarbon cracking charge in liquid phase, which may if desired be admixed with an inert fluid such as steam, with vapor phase hydrocarbon cracking charge, or with both inert fluid and vapor phase cracking charge, is introduced through line 20 into the upper end of conduit 24, and passes downwardly through conduit 24 with rotary motion imparted thereto by the helical baffle means 46. The charge then passes into the expanded zone provided by baffle 42, the rotary motion of the hydrocarbon charge causing the latter to move laterally as well as downwardly while passing through the expanded zone.

Inert fluid such as steam is introduced through line 18 into annular passageway 28, and passes downwardly through passageway 50 into the space therebeneath. The purpose of the steam is to protect metal surfaces from accumulation of excessive coke resulting from impingement and coking of oil droplets thereon. The use of such steam is not essential in all instances however. As the steam and liquid hydrocarbon charge pass downwardly beneath the lower end of baffle 42, they are commingled and travel laterally and downwardly into contact with the falling solids. As a result of the lateral component of motion of the fluid material, solids are deflected in a lateral direction and spread over the cross-sectional area of the conversion vessel. Not all of the solid particles are thus deflected, and some fall downwardly in substantially the same path as they would take in the absence of the laterally moving liquid hydrocarbon. Thus, an advantageous widening of the falling curtain is provided, with the result that the contact material is distributed over a larger portion of the horizontal cross section, including the portion directly beneath the assembly for introduction of liquid hydrocarbon and contact material.

In the operation of the apparatus illustrated in FIGURE 1, the liquid hydrocarbon charge is atomized prior to its discharge from the lower end of conduit 24. This atomizing is brought about by the rotary motion of the hydrocarbon material caused by passage through the portion of the conduit containing the helical baffle 46, and by the presence of vapor phase material, such as steam or hydrocarbon vapors, in admixture with the liquid hydrocarbon material. The rotary motion imparted to the fluid material continues beneath the baffle 46, and is essential to provide, in combination with the expanded conduit section 42, the desired lateral motion of the fluid material after discharge from the lower end of conduit section 42. In the light of the present specification, a person skilled in the art can select proper operating conditions for providing the necessary atomizing of the hydrocarbon charge.

The granular solids introduced into vessel 10 are at a conversion-supporting temperature as known in the art, and a portion of the liquid hydrocarbon charge is vaporized upon contact with the solids. The evolved vapors are passed downwardly concurrently with the solids gravitating through the lower portion of vessel 10, and undergo further conversion during such passage. Additional portions of the liquid on the solids are vaporized during passage of solids through the lower portion of vessel 10, and the vaporous conversion products are disengaged by suitable means not shown and removed through line 22 for further processing as well known in the art. The unvaporized liquid on the solid particles is converted to coke, and the solids containing coke deposits are withdrawn through line 16, for regeneration by conventional means not shown. In the regeneration process, the coke deposits are burned from the solid particles, and the regenerated particles are elevated to a level above vessel 10 and introduced again through line 14 to effect further conversion of hydrocarbon charge.

Figure 2:
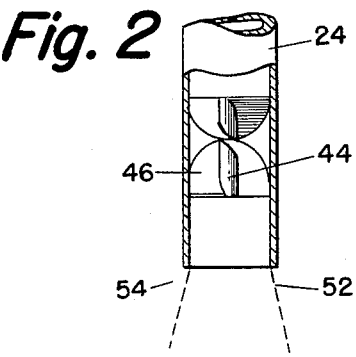

The mechanism by which the process and apparatus according to the present invention improve the spreading of oil and contact material laterally over the cross section of the vessel will be further explained with reference to FIGURES 2, 3, 4 and 5 of the drawing. In FIGURE 2, the central conduit 24 for liquid hydrocarbon charge is illustrated, without the lower expanded conduit 42 attached thereto. The stream of atomized liquid hydrocarbon issuing from the lower end of conduit 24 has an outer boundary as represented by the dashed line 52. A small number of individual droplets are without this boundary, but most of the liquid is within. The numeral 54 indicates a space adjacent the liquid stream at a location near the lower end of conduit 24. As a result of the passage of liquid downwardly beneath the lower end of conduit 24, and of the existence of a low pressure area at the center of the helically moving liquid stream, fluid is drawn horizontally from the space 54 toward the axis of the liquid stream, and the liquid in the stream is largely prevented from passing laterally away from the axis beyond the boundary 52.

Figure 3:
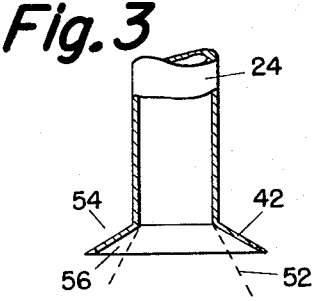

Turning now to FIGURE 3, a frustoconical conduit section 42 is again attached to the lower end of conduit 24, as in FIGURE 1. The boundary 52 of the liquid stream is at a lesser angle with the horizontal than in FIGURE 2, because of the effect of the wall of conduit section 42 in preventing fluid from passing directly horizontally from the space 54 into contact with the liquid stream. The only way in which fluid from the space 54 can pass into contact with the liquid stream within conduit section 42 is by passing around the lower end of conduit section 42 and upwardly into the restricted space 56 between the liquid stream and the wall of conduit section 42. Consequently, the extent to which fluid material is drawn into the fluid stream from outside the fluid stream while the latter is passing through conduit section 42 is reduced, as compared with the FIGURE 2 operation, thus permitting the liquid stream to expand laterally to a greater extent while passing through conduit section 42. This lateral expansion, once begun, is enabled to continue as the liquid stream passes downwardly beneath the lower end of conduit section 42. Thus, the liquid is directed laterally to a greater extent than in the operation illustrated in FIGURE 2.

Figure 4:
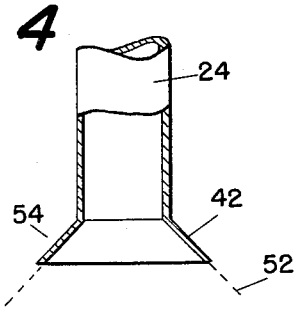

Referring now to FIGURE 4, an apparatus similar to that shown in FIGURE 3 is illustrated, with the difference that the conduit section 42 has a frustoconical wall which is inclined at a greater angle with the horizontal than in FIGURE 3. Fluid from space 54 is again prevented from passing directly horizontally into the liquid stream as the latter passes through conduit section 42. This permits the liquid stream to expand laterally, under the influence of the rotary motion provided by the helical baffle 46. In this instance, the expansion is sufficient to substantially fill the cross-sectional area of the conduit section 42, and substantially completely prevent the passage of fluid material from outside the liquid stream upwardly into the conduit section 42.

The smallest angle of the conduit section 42 with the horizontal which will result in the liquid stream completely filling the cross-sectional area of the conduit section 42 varies with the operating conditions. If the angle with the horizontal is decreased below this smallest angle, a situation as illustrated in FIGURE 3 is obtained. If the angle with the horizontal is increased beyond this smallest angle, the liquid stream, though still filling the cross section of conduit section 42, is laterally expanded to a lesser degree because of the greater angle with the horizontal of the boundary 52.

The optimum extent of lateral expansion is generally obtained when the angle of the conduit section 42 with the horizontal is the smallest which will result in the liquid stream completely filling the cross-sectional area of the conduit section. The latter angle varies with the operating conditions, but under a typical set of conditions may be approximately 30° for example. It is often desirable, however, to provide operation as illustrated in FIGURE 3, since this tends to reduce the contact of oil droplets with the inner wall of conduit section 42, and thereby reduce the tendency for coking of oil on that wall.

Figure 5:
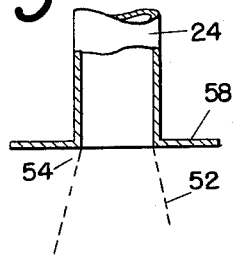

Referring now to FIGURE 5, the conduit 24 illustrated therein has a flange 58 secured to the lower end thereof. The boundary of the liquid stream is again represented by the numeral 52, and the angle of this boundary with the horizontal is approximately the same as in FIGURE 2. Fluid from the space 54 is permitted to pass directly horizontally into the fluid stream at a level adjacent to the lower end of conduit 24. Consequently, the liquid stream is inhibited, to approximately the same extent as in the operation illustrated in FIGURE 2, from expanding laterally.

Thus, it is seen to be necessary, in order to obtain the benefits of the invention, to provide a conduit section which is downwardly as well as laterally extended, so that fluid is prevented from passing directly horizontally into the liquid stream at a level adjacent to the lower end of conduit 24. The downward extension of the conduit section need not be very great, and the angle of the conduit section with the horizontal can be as small as 5° for example, though it is preferred that the angle be at least about 20°. Preferably, the angle with the horizontal is not substantially greater than 80°, and more preferably it is less than about 70°. The length of the expanded conduit section also need not be very great, since in some instances, a large effect in causing the liquid to move laterally can be obtained with an expanded conduit section having a height which is only one-tenth or less of the diameter of the conduit 24. Preferred heights of the expanded conduit section are those within the approximate range from ¼ to 1½ times the major dimension of the conduit 24.

Figure 6:
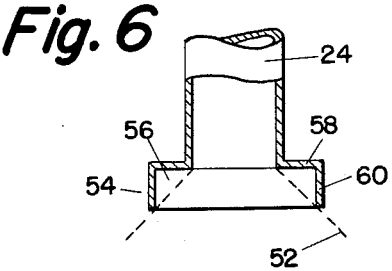

Referring now to FIGURE 6, the conduit 24 illustrated therein has a flange 58 secured to the lower end thereof, and a depending skirt member 60 is secured to the outer edge of the flange 58. The boundary of the liquid stream is again represented by the numeral 52. Passage of fluid material directly horizontally into the expanded conduit section provided by flange 58 and skirt 60 is prevented by the wall of the skirt 60. Thus a substantially quiescent fluid space 56 is provided within the expanded conduit section and surrounding the liquid stream. The expanded conduit section provided by the flange 58 and skirt 60 is approximately equivalent in its effect to the frustoconical expanded section 42 of FIGURE 4.

Figure 7:
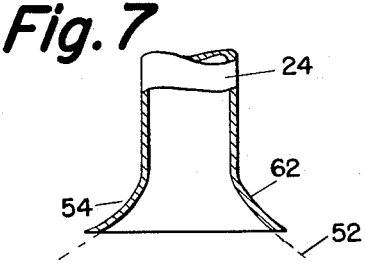

Referring now to FIGURE 7, the conduit 24 illustrated therein has a lower flared conduit section 62 attached to the lower end thereof. The boundary of the liquid stream is again represented by the numeral 52, and passage of fluid directly horizontally from space 54 into conduit section 62 is prevented by the wall of the conduit section.

Figure 8:
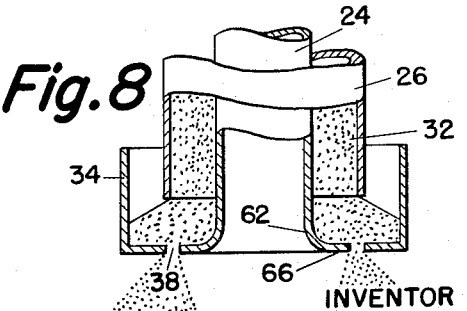

Referring now to FIGURE 8, the conduit 24 has secured to the lower end thereof a flared conduit section 62. A sleeve 26 provides an annular space 32 through which contact material gravitates as a compact mass. Sleeve 34 and associated apparatus provide a chamber through which the contact material gravitates as a compact mass prior to passing through orifice 38 into the falling curtain of contact material therebeneath. The apparatus illustrated in FIGURE 8 differs from that described with regard to FIGURE 1 in that the inner annulus 28 for inert fluid has been eliminated. The operation is generally the same as in FIGURE 1, though differing in a respect described in connection with FIGURE 9.

Figure 9:
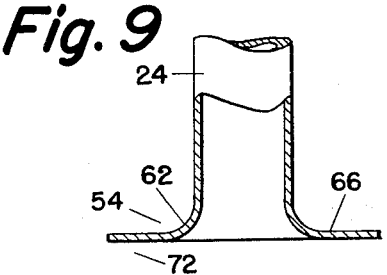

Referring to FIGURE 9, apparatus similar to that in FIGURE 7 is shown, with the additional feature that an annular plate 66 is secured to the outer edge of flared conduit section 62. In operation, the liquid stream moves outwardly during passage through conduit section 62, in a manner similar to that in FIGURE 7, fluid from zone 54 being unable to move horizontally into the liquid stream in conduit section 62. As the liquid emerges from conduit section 62, it already has, in contrast to the liquid emerging from conduit 24 in FIGURE 5 for example, begun lateral expansion away from the axis of conduit 24. This fact enables the liquid stream to sweep away the fluid in zone 72 and travel horizontally, or nearly horizontally, for a substantial distance after emerging from conduit section 62, the low pressure area that would otherwise exist at the center of the liquid stream being largely eliminated. The presence of plate 66 causes the liquid stream to be directed laterally to a greater extent than in the absence of plate 66, as in FIGURE 7 for example. A similar result is obtained in the FIGURE 8 apparatus as a result of the presence of the plate 66.

In all of the above FIGURES 3 to 9, it is to be understood that a helical baffle or other means for providing rotary motion is provided within the conduit 24.

The present invention involves introducing liquid hydrocarbon through a relatively constricted upper conduit, and then through a relatively expanded conduit section therebeneath, while preventing passage of fluid directly horizontally from outside the lower conduit section into that conduit section. Preferably the upper conduit has substantially constant cross-sectional area throughout its height, though it is within the scope of the invention to provide a downwardly increasing cross-sectional area, provided that the rate of increase is less than the rate of downward increase of cross-sectional area in the conduit section therebeneath.

In the passage of liquid hydrocarbon charge downwardly through conduit 24, any suitable means can be employed to impart rotary motion to the liquid hydrocarbons. Thus, in place of the helical baffles 46, a tangential horizontal inlet for the liquid hydrocarbon charge can be employed to provide the desired rotary motion. Any other suitable means for imparting rotary motion can also be employed.

The invention has been described previously with regard to a conversion vessel containing a single assembly for provision of an annular falling curtain of solids and a central stream of liquid hydrocarbon charge. It is to be understood that any suitable number of such assemblies can be employed in a single reaction vessel. Preferably the assemblies are spaced uniformly over the cross section of the vessel, in order that solids and charge from the respective assemblies are distributed over substantially equal portions of the cross-sectional area.

The hydrocarbon charge introduced in liquid phase into the conversion zone can, according to the invention, be introduced in admixture either with vapor phase hydrocarbon charge, or with an inert fluid such as steam. If desired, vapor phase hydrocarbon charge can be separately introduced into the conversion zone. Thus, for example, referring to FIGURE 1, vapor phase hydrocarbon charge can be introduced through line 66, and passed downwardly through the solids bed 64, the products of conversion of the vapor phase charge being withdrawn through line 22 together with the products of conversion of the liquid phase charge.

The present invention provides advantageous distribution of liquid hydrocarbon charge over the cross-sectional area of the conversion vessel. Together with this result, greater lateral distribution of granular solids over the cross-sectional area of the vessel is also obtained. It is undesirable to provide too great lateral displacement of the solids in the falling annular curtain, but it is necessary to provide at least a minimum extent of such lateral displacement in order to obtain the benefits of good contact and distribution. The present invention provides an extent of lateral displacement which is optimum from the standpoint of good contact and good distribution.

It is important to distribute liquid hydrocarbon charge over the cross-sectional area of the conversion vessel in order to avoid uneven temperature distribution. Good liquid distribution is also required in order to avoid excessive concentration of liquid in localized portions of the conversion vessel, e.g. directly beneath the conduit for introduction of liquid hydrocarbon.

If desired, means can be provided to prevent migration of liquid hydrocarbon droplets to the wall of the conversion vessel. Such means are well known in the art, as illustrated for example in United States Patent No. 2,492,998, issued January 3, 1950, to R. C. Lassiat; United States Patent No. 2,492,999 issued January 3, 1950, to R. C. Lassiat; and United States Patent No. 2,493,035, issued January 3, 1950, to R. T. Savage.

It is also within the scope of the invention to provide, if desired, means for directing the annular curtain of falling solids inwardly, as disclosed in United States Patent No. 2,766,187, issued October 9, 1956, to E. V. Bergstrom. It is also within the scope of the invention to provide, if desired, means for providing a plurality of concentric annular falling curtain of solids, as disclosed in United States Patent No. 2,770,583, issued November 13, 1956, to J. H. Haddad.

The present invention is applicable generally to hydrocarbon conversion processes involving contact of liquid hydrocarbon material with granular solid contact material. Cracking, coking, reforming, desulfurization processes, etc. are typical of the types of conversion to which the present invention may be applied. A particularly beneficial application of the invention is in hydrocarbon cracking processes to produce gasoline from higher molecular weight charge stocks. Typical operation in such processes involves introducing heated contact material, at a temperature for example within the approximate range from 800° F. to 1200° F., into a cracking zone, and introducing hydrocarbon charge into the cracking zone at a temperature within the approximate range from 600° F. to 900° F. The contact material withdrawn from the cracking zone is introduced into a regeneration zone, wherein it is contacted with free-oxygen containing gas under conditions suitable for oxidation of carbonaceous materials deposited on the solids during the cracking operation. It is then customary to elevate the solids by suitable known means to a position above the cracking vessel, and gravitate the solids as a compact mass through the cracking vessel again.

Natural or activated clays, bauxite, activated alumina, synthetic silica-alumina catalyst, etc. are examples of catalytic materials to which the invention is applicable. However, any of the well known granular conversion catalysts can be employed. Zirkite, mullite, corhart, etc. are examples of refractory heat transfer materials which can be employed as conversion-supporting solid materials according to the invention. However, any of the other well known inert refractory materials for use in hydrocarbon conversion processes can also be employed. The particle size of the granular solid material employed in the process according to the invention is generally within the approximate range from 3 to 20 mesh on the United States Sieve Series scale.

If desired a helical baffle, not shown, similar to baffle 46 can be employed within annulus 28, its inner surface being secured to conduit 24 and its outer surface adjacent or secured to sleeve 26, and a conduit section which is expanded relative to sleeve 26 can be secured to the lower end of sleeve 26, in order to cause inert fluid issuing from annulus 28 to move laterally outwardly according to the mechanism described previously and cause the solids to be deflected outwardly. Such means can be similar in construction and arrangement to the corresponding means associated with conduit 24, i.e. the baffle 46 and conduit section 42, and can be located at about the same horizontal level as the corresponding means associated with conduit 24, although this is not essential.

Figure 10:
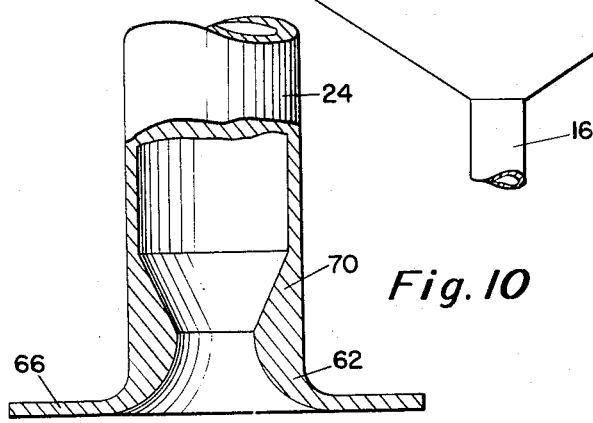

In FIGURE 10, a modification is illustrated wherein conduit 24 has a thickened wall 70 which provides a downwardly tapering portion of the conduit just above the widening portion provided by the conduit section 62. A plate 66 is provided, similarly to FIGURE 9. Typically, the height of the tapering portion may be about one-half the inner diameter thereof at the upper end, and the angle of the side wall of the tapering portion about 15° with the vertical. However, these dimensions are merely illustrative, and a person skilled in the art can readily apply the principle herein disclosed to various situations in which different dimensions will be optimum.

The tapering portion is beneficial in that it increases the velocity of the liquid particles, and also aids in recombining the plural streams issuing from the lower end of the helical baffles, which are preferably used in conjunction with the apparatus of FIGURE 10. Since those baffles divide the fluid material into portions passing through separate helical channels, these portions must recombine below the lower ends of the baffles in order to provide a uniform rotating stream. Such combination occurs in a generally satisfactory manner when the tapering portion provided by wall 70 is not used, but in a superior manner when the tapering portion is used.

The tapering portion has in itself beneficial effects on the fluid flow pattern, but optimum results with respect to uniform distribution of fluid are obtained when it is used, as in FIGURE 10, in combination with outwardly expanding baffle means such as those provided by conduit section 62.

This application is a continuation-in-part of copending application Serial No. 686,251, filed September 25, 1957, now abandoned.

The invention claimed is:

1. Apparatus for converting hydrocarbons which comprises: a conversion vessel; a central, downwardly extending conduit therewithin, adapted to convey fluid hydrocarbons downwardly with rotary motion, the lower end of the conduit being substantially unobstructed and communicating with a space which is laterally expanded relative to the conduit; means for introducing fluid hydrocarbons into an upper portion of the conduit; a conduit section secured to the lower end of said downwardly extending conduit, the inner sidewalls of said conduit section having angle with the horizontal which gradually downwardly decreases from 90° to 0°, the height of said conduit section being within the range from 0.1 to 1.5 times the major dimension of the horizontal cross section of said downwardly extending conduit; baffle means secured to the lower end of said conduit section and having a substantially horizontal, annular lower surface extending outwardly from the lower end of said conduit section; means providing an annular, downwardly extending conduit for granular solids surrounding the central conduit and having an annular construction at the lower end thereof, said vessel containing space for lateral movement of an annular stream of solids falling beneath the construction and space for downward travel of a compact bed of solids beneath the falling stream; and means for separately removing solids and fluid conversion products from the vessel.

2. Apparatus for converting hydrocarbons which comprises: a conversion vessel; a central, downwardly extending conduit therewithin, adapted to convey fluid hydrocarbons downwardly with rotary motion, the lower end of the conduit being substantially unobstructed and communicating with a space which is laterally expanded relative to the conduits; means for introducing fluid hydrocarbons into an upper portion of the conduit; baffle means comprising a depending skirt member and defining a conduit section secured to the lower end of said downwardly extending conduit and having inner sidewall extending outwardly and downwardly at an angle with the horizontal in the range from 5 to 30°, said baffle means being adapted to prevent passage of fluid material horizontally from without the conduit section into contact with hydrocarbons passing downwardly from the lower end of said downwardly extending conduit prior to beginning of lateral expansion of the ejected hydrocarbons; means providing an annular, downwardly extending conduit for granular solids surrounding the central conduit and having an annular constriction at the lower end thereof, said vessel containing space for lateral movement of an annular stream of solids falling beneath the constriction and space for downward travel of a compact bed of solids beneath the falling stream; and means for separately removing solids and fluid conversion products from the vessel.

3. Apparatus according to claim 2 wherein said baffle means comprise a flange member secured to the lower end of said conduit, and a depending skirt member secured to the outer edge of said flange member.

References Cited in the file of this patent

UNITED STATES PATENTS

| 2,296,426 | Coutant | Sept. 22, 1942 |
| 2,538,195 | Henkel | Jan. 16, 1951 |
| 2,556,198 | Lassiat | June 12, 1951 |

(Other references on following page)

UNITED STATES PATENTS

| | | |
|---|---|---|
| 2,766,073 | Bergstrom | Oct. 9, 1956 |
| 2,786,801 | McKinley et al. | Mar. 26, 1957 |
| 2,886,520 | Cicalese | May 12, 1959 |
| 2,906,705 | Cross | Sept. 29, 1959 |

FOREIGN PATENTS

| | | |
|---|---|---|
| 658,594 | Great Britain | Oct. 10, 1951 |
| 1,055,929 | France | Feb. 23, 1954 |